United States Patent [19]

Gimson

[11] Patent Number: 5,576,487
[45] Date of Patent: Nov. 19, 1996

[54] APPARATUS FOR CALIBRATING A FLUID MASS FLOWMETER

[75] Inventor: Christopher J. Gimson, Westhoughton, United Kingdom

[73] Assignee: Endress + Hauser Limited, Manchester, Great Britain

[21] Appl. No.: 256,876

[22] PCT Filed: Nov. 3, 1992

[86] PCT No.: PCT/GB92/02025

§ 371 Date: Jul. 26, 1994

§ 102(e) Date: Jul. 26, 1994

[87] PCT Pub. No.: WO93/15381

PCT Pub. Date: Aug. 5, 1993

[30] Foreign Application Priority Data

Jan. 28, 1992 [GB] United Kingdom ............... 9201753

[51] Int. Cl.[6] ............................................. G01F 1/68
[52] U.S. Cl. ..................................... 73/204.11; 73/3
[58] Field of Search .................. 73/204.11, 204.18, 73/204.22, 204.25, 204.26, 204.27, 118.2, 3; 364/510

[56] References Cited

U.S. PATENT DOCUMENTS

| 4,335,605 | 6/1982 | Boyd | 73/204.14 |
| 4,415,279 | 11/1983 | Beuse et al. | 73/204.13 |
| 4,501,145 | 2/1985 | Boegli et al. | 73/204.17 |
| 4,961,348 | 10/1990 | Bonne | 73/204.18 |
| 5,177,696 | 1/1993 | Bonne | 73/204.17 |
| 5,237,523 | 8/1993 | Bonne et al. | 73/204.18 |

Primary Examiner—Richard Chilcot
Assistant Examiner—Harshad Patel
Attorney, Agent, or Firm—Bose McKinney & Evans

[57] ABSTRACT

A flowmeter is provided for measuring a mass flow rate of a non-calibrated target fluid passing through a conduit utilizing a calibration obtained from a calibrated known fluid. The flowmeter includes a mechanism for calibrating the flowmeter based upon the calibrated known fluid by storing a relationship between Reynolds number and Nusselt number for the calibrated known fluid passing through the flowmeter. The flowmeter further includes a mechanism for calculating the mass flow rate of the non-calibrated target fluid from the stored relationship between Reynolds number and Nusselt number for the calibrated known fluid.

15 Claims, 6 Drawing Sheets

APPARATUS FOR CALIBRATING A FLUID MASS FLOWMETER

The present invention relates to a fluid mass flowmeter.

Fluid mass flowmeters are known for providing an output representative of the mass flow of a target fluid through a conduit. The known flowmeters comprise a transducer for location in the conduit, means for supplying heating power to the transciucer, means for measuring the rate at which power is supplied to the transducer, means for measuring the temperature of the fluid within the conduit, means for measuring the temperature of the transducer, and means for calculating the mass flow from the measured rate of power supply, fluid temperature and transducer temperature. The underlying principle of operation is that, the greater the rate of flow, the greater is the rate of heat loss from the transducer.

The known flowmeters once calibrated provide accurate results. Unfortunately calibration is a major problem and the calibration process represents a large proportion of the cost of flowmeters which are generally delivered to the end user calibrated for a specific target gas. Typically, the end user specifies to the flowmeter supplier the identity of the target gas or mixture of gases, operating parameters such as minimum and maximum flow rates, and the required meter accuracy. The manufacturer calibrates the flowmeter by obtaining a supply of the target gas or mixture of gases and running that supply through a test rig to which the flowmeter is connected. In this way calibration data is obtained directly in a test environment which is a near as possible identical to the intended conditions of use of the flowmeter.

The above calibration procedure is easy to execute if the target gas is air. It is also relatively easy no execute if the target gas is a readily available inert gas which can be purchased at a relatively low price and can be handled using simple procedures. Where the target gas is not readily available, or is for example potentially explosive or poisonous and therefore must be handled with great care, the test procedures become very expensive and inconvenient.

The transducers which are used in the known flowmeters generally have a cylindrical outer wall which is in contact with the target gas. There has been much research into heat loss from cylinders in gas flows and this indicates that there is no simple relationship that is independent of the nature of the target gas. Fortunately, the available literature has been thoroughly surveyed in the document "The Overall Convective Heat Transfer from Smooth Circular cylinders" by V. T. Morgan, PP199–264 Advances in Heat Transfer, Volume 11, 1975, Academic Press Inc. (London) Limited, 24/28 Oval Road, London NW1. This review explores the relationship between Nusselt Number for any given Reynolds Number. The mathematical correlation produced from the reviewed data indicated a variation in Nusselt Number of from 10% to 46% for any given Reynolds Number. The Reynolds Number is a dimensionless number which is significant in modelling any system in which the effect of viscosity is important in controlling the velocity or flow pattern of a fluid. It is equal to the density of the fluid, multiplied by its velocity, multiplied by a characteristic length, and divided by the fluid viscosity. The Nusselt Number is a dimensionless number used in the study of forced convection which gives a measure of the ratio of the total heat transfer to conductive heat transfer and is equal to the heat transfer coefficient multiplied by a characteristic length divided by the thermal conductivity.

The literature reviewed by Morgan indicates that for a specified gas and a specified rate of power supply to the transducer, a unique curve interrelating Nusselt Number and Reynolds Number can be derived. Thus if the rate of power supplied to a transducer is maintained constant, and the relationship between Nusselt Number and Reynolds Number is established using a supply of gas on a test rig, the thus calibrated flow meter could be used to monitor the flow of that same gas in a practical application, the predetermined Nusselt Number versus Reynolds Number relationship being used to accurately determine the flow rate in the practical application. There is no suggestion however that calibration data derived with one gas can enable the use of the thus calibrated meter to accurately monitor the flow of a different gas.

Heat losses from heated bodies positioned within a fluid flow can arise from a number of factors. Natural and forced convection predominate, and natural convection can generally be regarded as negligible at flow rates to be expected in practical flowmeter applications. Wall effects can however be significant, than is the effect of an adjacent pipe wall on heat losses from a transducer body close to that pipe wall. Practical flowmeter designs often incorporate small diameter pipe configurations which increase the significance of wall effects. Body losses, for example conduction to the pipe wall through the structure supporting the transducer may; also be significant. Furthermore in practical flowmeters it will generally not be possible to directly monitor the true temperature of the outer skin of the transducer wall. Thus the problems exemplified by the literature reviewed by Morgan can be expected to be more severe in practical flowmeter applications than in laboratory test applications of the type to which most of the reviewed prior art relates.

It is an object of the present invention to provide a flowmeter which can be readily calibrated.

According to the present invention there is provided a fluid mass flowmeter for providing an output representative of the mass flow of a target fluid through a conduit, comprising a transducer for location in the conduit, means for supplying heating power to the transducer, means for measuring the rate at which power is supplied to the transducer, means for measuring the temperature of the fluid within the conduit, means for measuring the temperature of the transducer, and means for calculating the mass flow from she measured rate of power supply, fluid temperature and transducer temperature, wherein the flowmeter comprises means for storing a predetermined representation of the relationship between Reynolds Number and Nusselt Number, the relationship being derived from test data obtained by passing at least one known fluid through the flowmeter at each of a plurality of flow velocities and at each of a range of power levels, means for calculating a target fluid film temperature from the measured transducer and fluid temperatures, the film temperature being representative of the temperature of the target fluid adjacent to the transducer, means for storing target fluid data representative of the variation with temperature of the target fluid viscosity and thermal conductivity, means for calculating the target fluid viscosity and thermal conductivity from the stored target fluid data and the film temperature, means for calculating the Nusselt Number for the target fluid from the measured rate of power supply, the difference between the measured transducer temperature and the measured fluid temperature, and the calculated thermal conductivity, means for calculating the Reynolds Number for the target fluid from the calculated Nusselt Number and the said relationship, and means for calculating the mass flow from the calculated Reynolds Number and the calculated viscosity.

The present invention relies upon a realisation that the relationship between the Nusselt Number and Reynolds Number does not vary significantly despite significant variations in the rate of power supply. Given a relationship between Nusselt Number and Reynolds Number which is independent of power level, a relationship derived from calibration tests relying upon one fluid can be used in association with data related to the viscosity and conductivity of a target gas to calibrate a meter for that target gas. Thus a flow meter can be calibrated for a target gas without it being necessary for that gas So be used in a calibration procedure.

In some practical implementations of the invention it may be appropriate to maintain a minimum power level of for example 50 mW to obtain a good Nusselt Number versus Reynolds Number characteristic. The target fluid data may be stored as polynomial constants.

The relationship between Nusselt Number and Reynolds Number may be derived simply by using a single test gas, for example air. Different test gases will however have slightly different Nusselt Number versus Reynolds Number relationships and accordingly depending upon the differences between the characteristics of the test gas and the target gas the accuracy of the calibration will be affected. This problem can be ameliorated however if the stored representation of the relationship between Nusselt Number and Reynolds Number is adjusted to be appropriate for a number of readily available test gases, for example, air, argon and helium. Three different simple Nusselt Number versus Reynolds Number relationships can be derived for the three test gases. A single "universal" relationship can however be derived by plotting Reynolds Number against Nusselt Number divided by Prandtl Number to a given power. The relationship between Nusselt Number, Reynolds Number and Prandtl Number can be represented as:

$$Nu = A \cdot Re^n \cdot Pr^m$$

where Nu is the Nusselt Number
where Re is the Reynolds Number
where Pr is the Prandtl Number, and A, n and m are constants.

The values of A, n and m, the values of which are functions of both gas properties and transducer geometry, can be selected so that for each of the three test gases the above equation "fits" all of the test data. The result is a curve which is "universal" in the sense that it "fits" each of the three test gases.

A single equation over the complete Reynolds Number range does not generally give an adequate accuracy over all the dynamic range. To overcome this, the characteristic may be split into a series of smaller characteristics, each pertaining to a range of Reynolds Numbers.

Thus, preferably the said relationship is derived by generating test data as a result of passing a plurality of known fluids through the flow meter at each of a plurality of power supply levels and each of a plurality of flow velocities, and selecting constants A, n and m to fit the equation $Nu = A \cdot Re^n \cdot Pr^m$. Means are also provided for storing target fluid data representative of the variation with temperature of the target fluid Prandtl Number, and the Reynolds Number calculating means is arranged to calculate the Reynolds Number from the calculated Nusselt and Prandtl Numbers and the said relationship.

Preferably, the said predetermined representation of the said relationship is stored in the form of constants relating the Nusselt Number to the Reynolds Number for each of a plurality of ranges of values for the Nusselt Number.

The target gas film temperature may be calculated as half of the sum of the measured transducer temperature and the measured fluid temperature.

The transducer may be in she form of a cylindrical body extending perpendicular to an internal wall of the conduit, the conduit having a circular cross-section. The transducer may comprise a heating element supported within a ceramic former located within a metallic sheath, the means for measuring the temperature of the transducer comprising a resistive sensor embedded within the ceramic former. The means for measuring the temperature of the fluid within the conduit may comprise a resistive temperature sensor spaced from the transducer within the conduit.

Embodiments of the present invention will now be described, by way of example, with reference to the accompanying drawings, in which.

Figure 1:
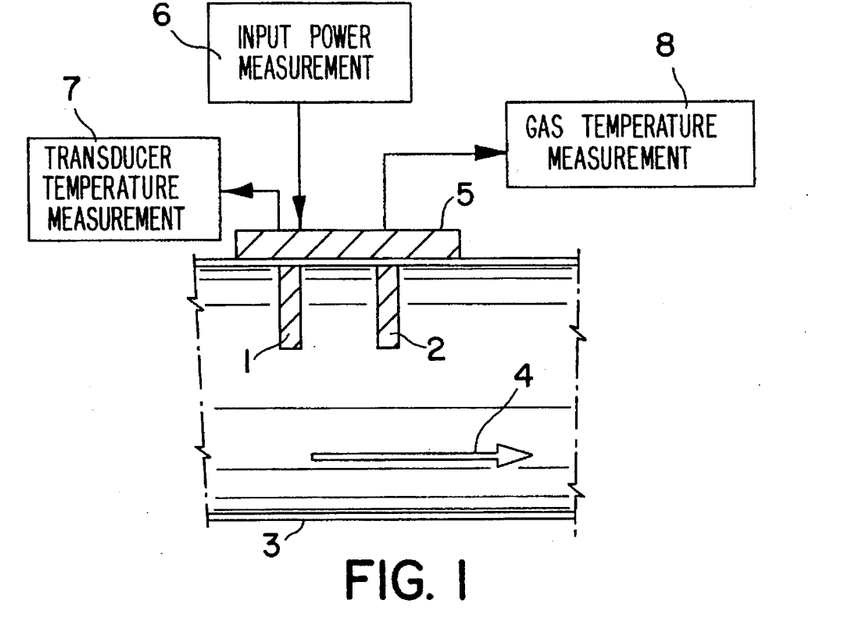
FIG. 1 is a schematic illustration of the arrangement of a flowmeter transducer and target gas temperature sensor of an experimental system in accordance with the present invention.
Figure 2:
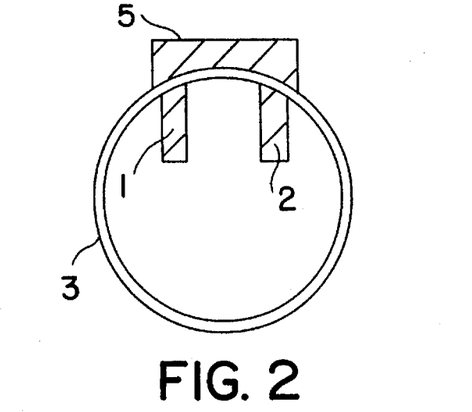
FIG. 2 illustrates the disposition of the transducer and gas temperature sensor relative to the cross-section of the pipe through which the gas flows.

Referring now to FIGS. 1 and 2, these Figures illustrate the disposition of a transducer 1 and a gas temperature sensor 2 within a pipe 3 through which a gas indicated by arrow 4 flows. The transducer 1 and gas temperature sensor 2 are supported in a block 5 mounted on the outside of the pipe 3. The transducer is connected to a power supply which supplies heating energy thereto. The magnitude of the supplied power is monitored by an input power measurement circuit 6 and the temperature of a temperature sensor within the transducer 1 is monitored by a transducer temperature measurement circuit 7. The temperature sensed by the gas temperature sensor is monitored by a gas temperature measurement circuit will be seen that the transducer 1 and temperature sensor 2 are spaced apart both axially and transversely relative to the pipe Referring now to FIG. 3, this illustrates the structure of both the transducer 1 and the temperature sensor 2. In the case of the transducer 1, wires 9 deliver power to a resistive heating element embedded within a ceramic former 10. Wires 11 are connected to a resistive temperature sensor also embedded within the ceramic former 10. The ceramic former is housed within a steel casing 12 supporting a threaded head 13 which secures the steel casing within the wall of the pipe 3. In the case of the transducer 2, the wires 9 are disconnected and the wires 11 are simply connected to the gas temperature measurement circuit 8. The transducer and temperature sensor may be proprietary units generally referred to as PT100 duplex transducers. The general structure of the apparatus described with reference to FIGS. 1 to 3 is conventional, the invention being related to the use to which the outputs and inputs described above are put.

Figure 3:
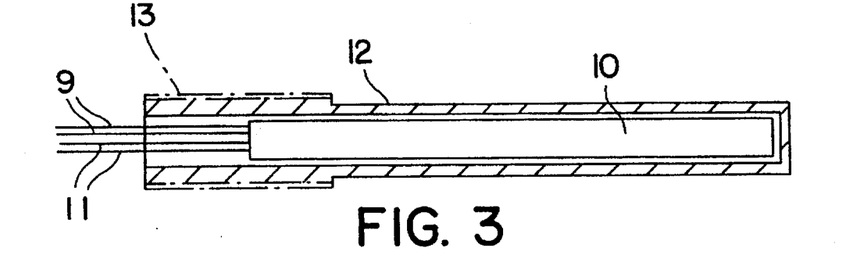
FIG. 3 illustrates the structure of both the transducer and gas temperature sensor of FIGS. 1 and 2.
Figure 4:
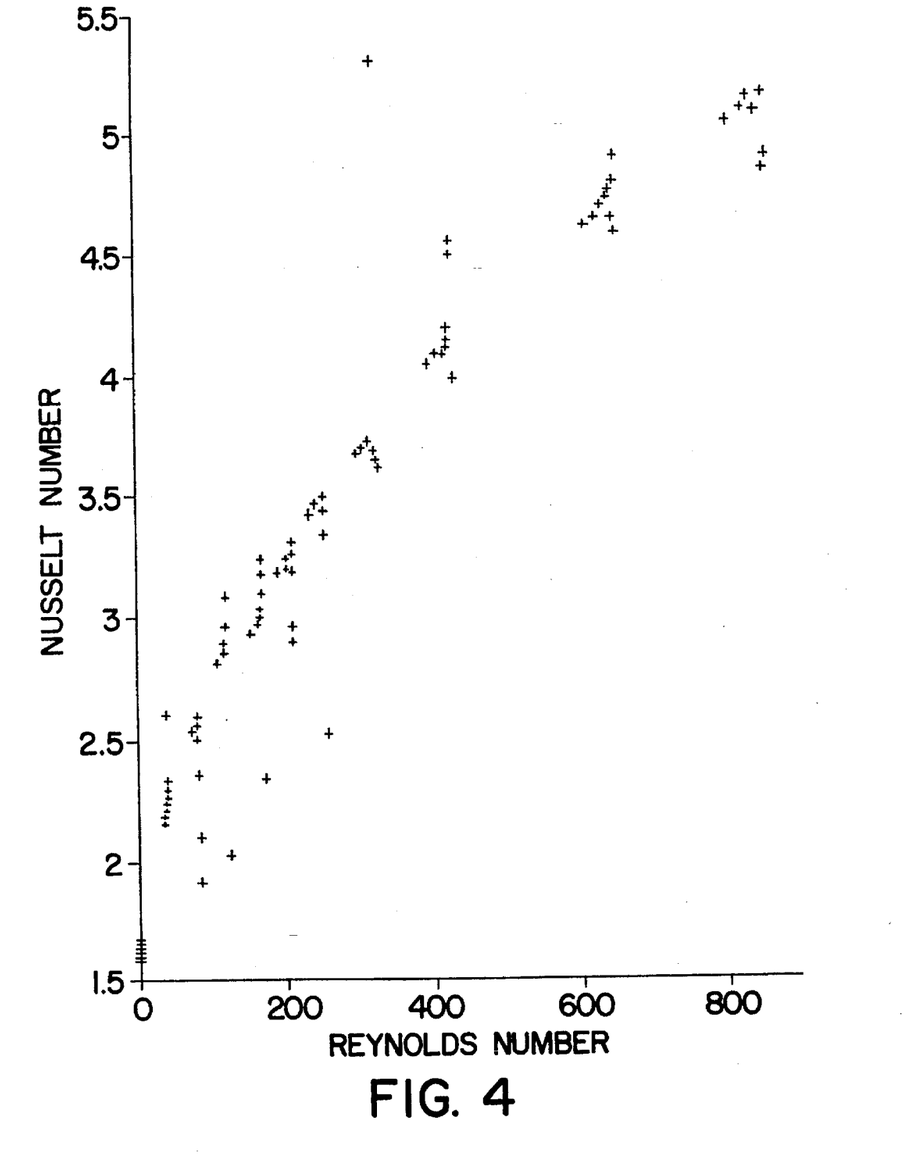
FIG. 4 illustrates the relationship between the Nusselt Number and Reynolds Number for a single gas flowing through the pipe of FIGS. 1 and 2.

Referring now to FIG. 4, this illustrates experimental results derived using the apparatus of FIGS. 1 to 3. FIG. 4 plots the relationship between the Nusselt Number and Reynolds Number for the described apparatus. It will be seen that there is considerable scatter in the results obtained which makes it impossible to derive a single curve representing all the derived data. The data illustrated in FIG. 4 was derived by passing air through the apparatus described with reference to FIGS. 1 to 3 at a variety of different flow rates and at a variety of different power supply levels. The power supply levels were in the range from zero to 200 mW. Most of the scatter in the results arose from data derived at low power settings. It is believed that the data derived at low power settings was significantly affected by limitations of the experimental apparatus and that in may be possible to reduce the scatter by adjustments to the apparatus.

Figure 5:
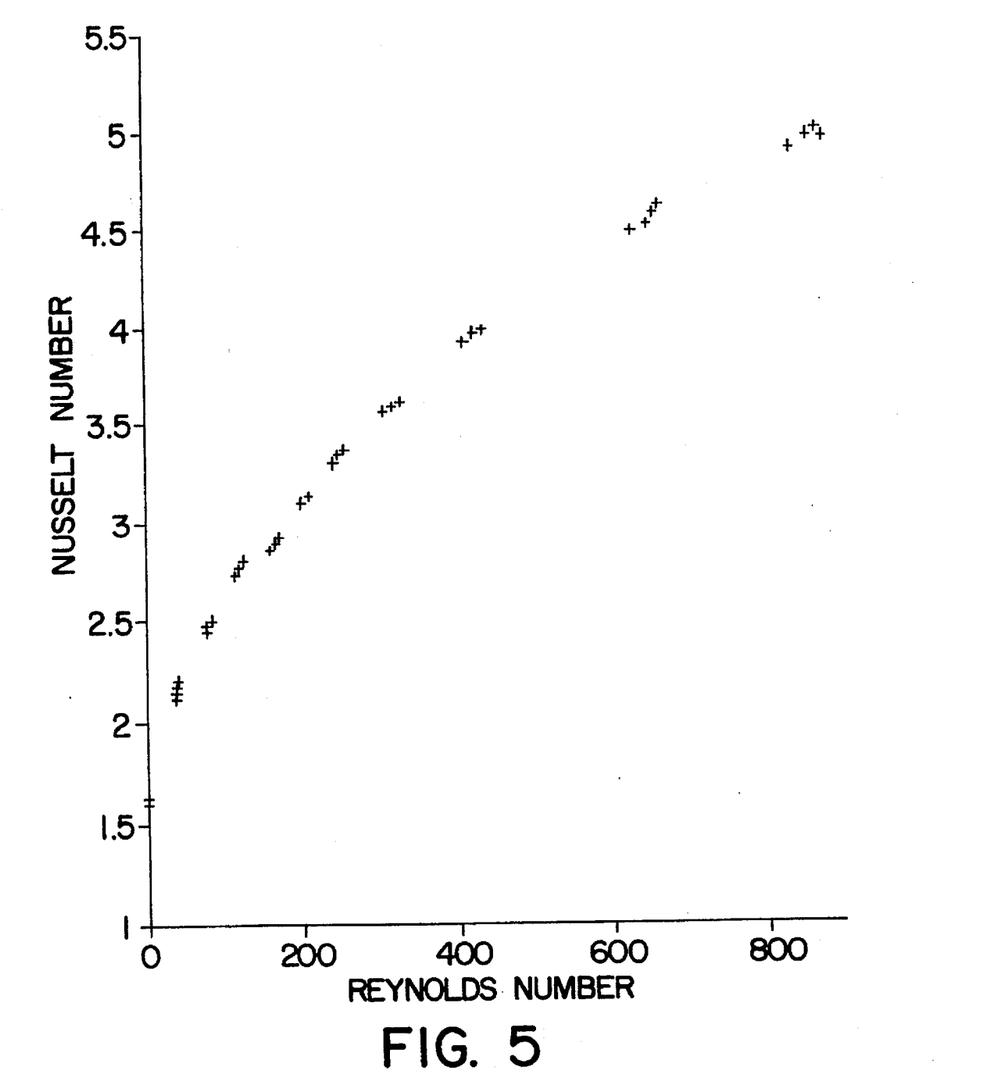
FIG. 5 illustrates the data taken from FIG. 4 for only a limited range of power supply levels no the transducer of FIGS. 1 and 2.

FIG. 5 illustrates part of the data shown in FIG. 4, all data derived from power supply levels less than 50 mW having been removed. It will be seen that the data shown in FIG. 5 enables a unique curve to be drawn which coincides with or is close to all of the derived data. Thus FIG. 5 represents a unique relationship between Nusselt Number and Reynolds Number for a single gas, the relationship being independent of the power supplied to the transducer and the differential temperature between the transducer and the gas flow. Such a curve would unable the calibration of the flowmeter intended for use with a known gas corresponding to that used to derive the original data. Furthermore, depending upon the accuracy requirements of the application, this curve may be sufficiently accurate to enable cross-correlation of the flowmeter for a series of different gases. A more universal curve can however be derived as described below.

Figure 6:
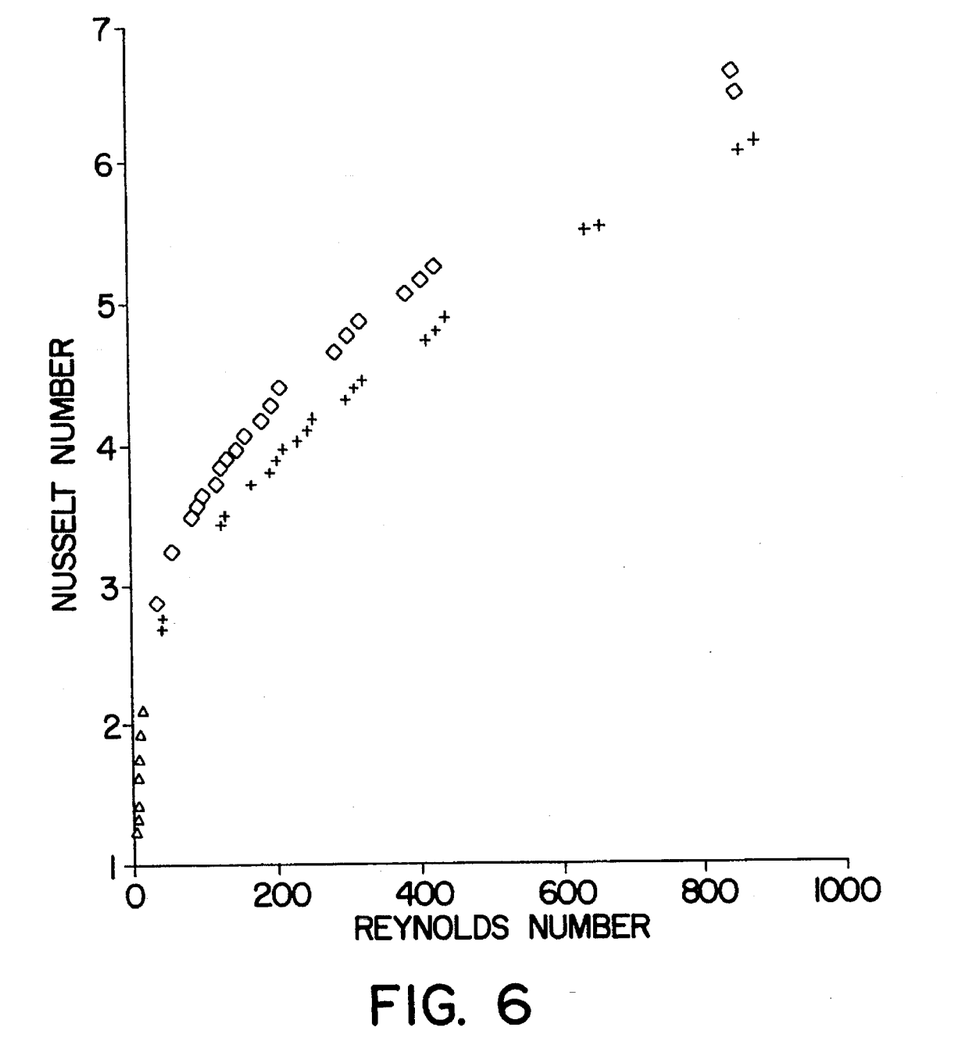
FIG. 6 illustrates the relationship between Nusselt Number and Reynolds Number for the same power levels as used in the case of FIG. 5 but for three different gases.

FIG. 6 represents data derived in the same way as the data was derived for FIG. 5 but with three different gases, that is air, argon and helium. It will be seen that the three different gases produce three different curves but that all of the curves display significant similarities. The data represented in FIG. 6 does not enable the production of a single universal curve however but this can be achieved by the derivation of a new equation to represent the relationship between Nusselt Number and Reynolds Number.

The conventional treatment for gas analysis suggests the equation:

$$Nu = A \cdot Re^n$$

The above equation represents in essence what is shown in FIGS. 5 and 6. To enable the data illustrated in FIG. 6 to be combined into a single unique calibration curve it is possible to consider the following equation:

$$Nu = A \cdot Re^n \cdot Pr^m$$

Using the above equation, the data represented in FIG. 6 can be rearranged by plotting:

$$Nu/Pr^p \text{ versus } Re$$

Figure 7:
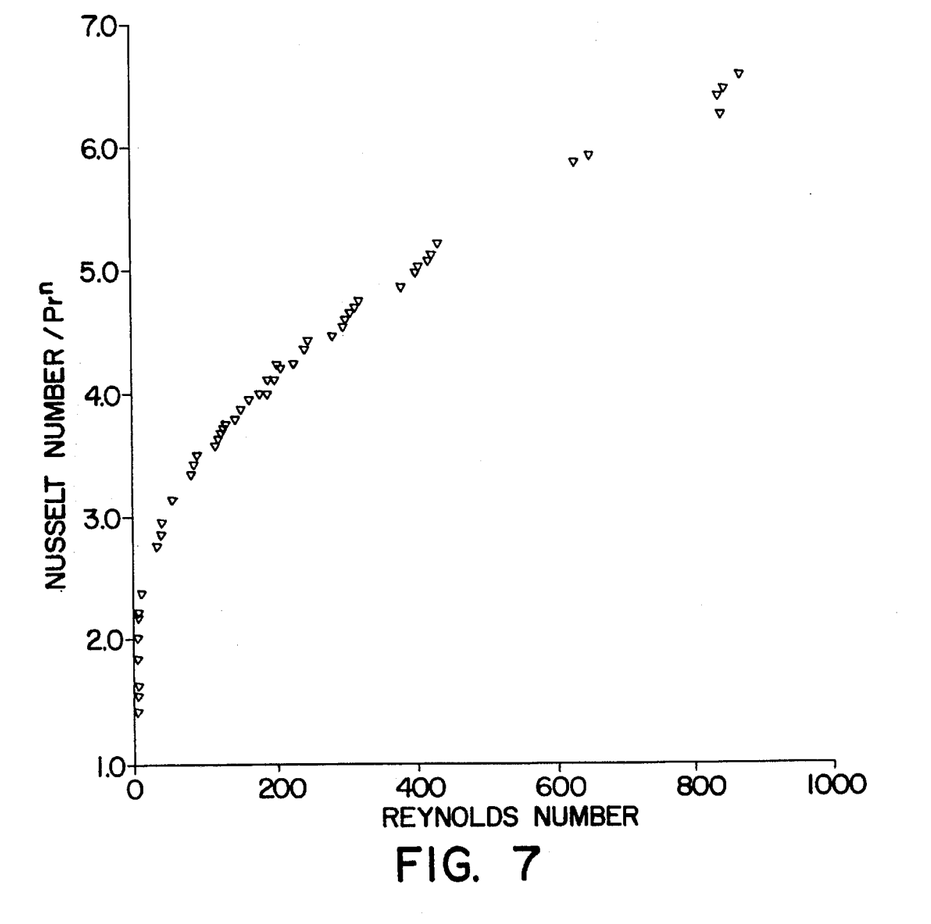
FIG. 7 illustrates the relationship between Nusselt Number and Reynolds Number after the data shown in FIG. 6 has been fitted to an equation relating Nusselt Number, Reynolds Number and Prandtl Number.

The result of plotting the data in FIG. 6 in this manner is illustrated in FIG. 7. The function $Nu/Pr^p$ will be referred to below as the "modified Nusselt Number" $Nu_m$. It was found that the three curves converge with a value of p ranging from $-1.8$ to $-2.6$ depending on the value of the Reynolds Number. The result is illustrated in FIG. 7. Thus FIG. 7 represents a "universal" characteristic which is independent of the gas type as well as the transducer power. This universal characteristic, although derived from only three gases, represents a closer approximation to the characteristic which would be achieved for any gas given the appropriate selection of constants in the above equation.

Thus by processing the derived data, it is possible to provide a "bestfit" curve through the datapoints together with equations which best define the required Reynolds Number in terms of the measured input data (heater and gas temperature and transducer power, gas property parameters and transducer geometry). A single equation over the complete Reynolds Number range would not give adequate accuracy but this problem can be overcome if the universal curve can be split into sub-sections, each pertaining to a range of Reynolds Number. For the data illustrated in the accompanying drawings, the bestfit line corresponds to the following:

For $10 < Re < 100$ $$Nu = 0.61179 \cdot Re^{0.19386} \cdot pr^{-2.2609}$$

For $100 < Re < 250$ $$Nu = 0.42457 \cdot Re^{0.25497} \cdot pr^{-2.4577}$$

For $250 < Re < 400$ $$Nu = 0.39101 \cdot Re^{0.20216} \cdot pr^{-2.1086}$$

For $400 < Re < 900$ $$Nu = 0.32063 \cdot Re^{0.33713} \cdot pr^{-1.9166}$$

If a universal curve of the type illustrated in FIG. 7 is derived for a particular flowmeter configuration, the derived data can be used to cross-correlate that flowmeter to a target gas which was not readily available for calibration purposes, providing the characteristics of the target gas are known and can be used to calculate appropriate values for the measured gas and transducer temperatures. It is of course necessary to take into account the actual temperature of the target gas as it flows past the transducer and this will not be identical to the measured transducer temperature as there will be a temperature gradient in the vicinity of the transducer. A reasonable approximation to the target gas temperature in the immediate vicinity of the transducer is half the sum of the transducer temperature and the gas temperature. This temperature approximation is referred to below as the film temperature.

The Prandtl Number (Pr), viscosity (μ) and thermal conductivity (k) can be represented by the following equations:

$$Pr = (A_{pr}) + (B_{pr} \cdot T_{film}) + (C_{pr} \cdot T^2_{film}) + (D_{pr} \cdot T^3_{film})$$

$$\mu = (A_\mu) + (B_\mu \cdot T_{film}) + (C_\mu \cdot T^2_{film}) + (D_\mu \cdot T^3_{film})$$

$$k = (A_k) + (B_k \cdot T_{film}) + (C_k \cdot T^2_{film}) + (Dk \cdot T^3_{film})$$

The coefficients A, B, C and D for each of the above equations can be derived from readily available data published in text books related to gas properties. Thus given a film temperature Tfilm it is possible to calculate the Prandtl Number, viscosity and thermal conductivity for any target gas of interest. The combination of this information with the universal curve of FIG. 7 enables a flowmeter calibrated with one or more test gases to be cross-calibrated to provide reasonably accurate measures of the flow rate of any target gas of interest.

Figure 8:
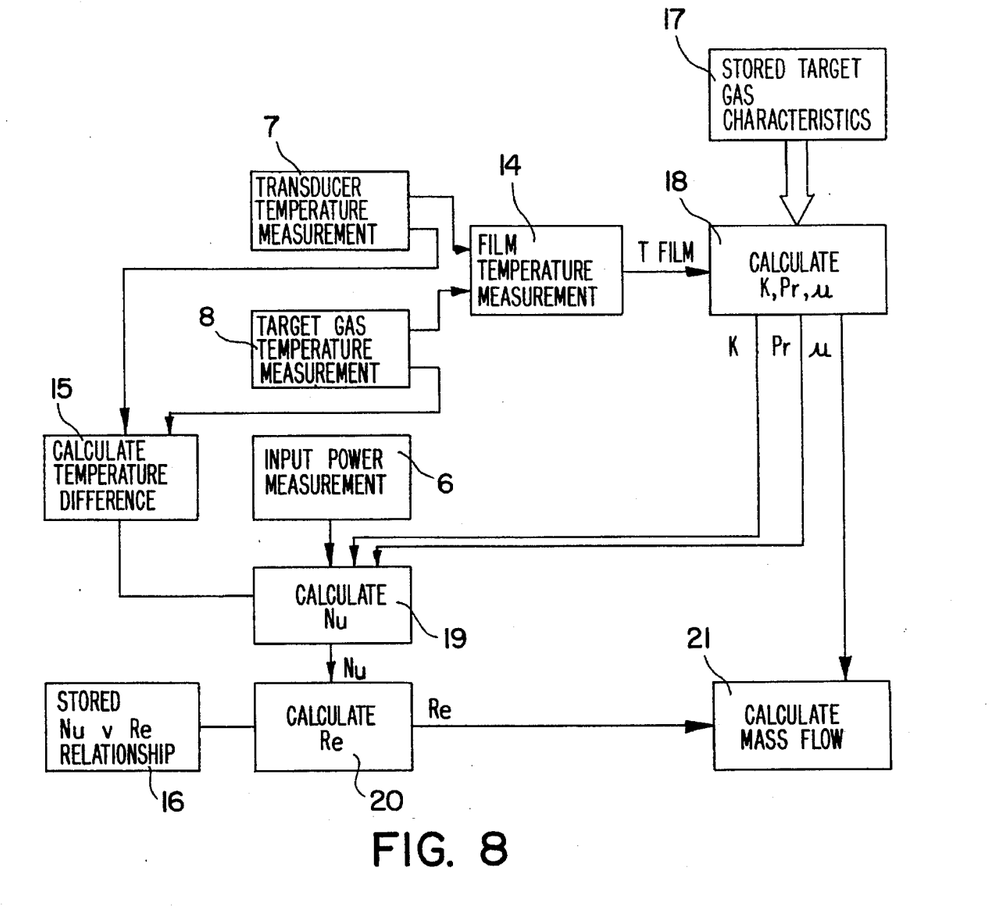
FIG. 8 is a schematic illustration of component parts of a flowmeter dataprocessing system embodying the present invention.

Referring now to FIG. 8, this is a schematic illustration of the components of a processing unit which can be associated with the apparatus of FIGS. 1 to 3 to cross-calibrate a flowmeter, thereby avoiding the need to calibrate a flowmeter with a target gas supplies of which are not readily available or cannot be used in convenient circumstances. The arrangement of FIG. 8 comprises an input power measurement circuit 6 corresponding to the circuit of FIG. 1, a transducer temperature monitoring circuit corresponding to the circuit of FIG. 1, and a gas temperature monitoring circuit corresponding to the circuit 8 of FIG. 1. In addition, a film temperature measurement circuit 14 produces an output $T_{film}$ which is equal to half the sum of the transducer and gas temperatures. The difference between the transducer temperature and the gas temperature is monitored by a temperature difference monitoring circuit 15. The data represented in FIG. 7 is stored in a modified Nusselt Number versus Reynolds Number relationship in storage circuit 16. The characteristics which enable the Prandtl Number, viscosity and thermal conductivity of the target gas to be calculated are stored in a circuit 17.

A device 18 calculates the thermal conductivity (k), Prandtl Number (Pr) and viscosity (μ). The Prandtl Number and thermal conductivity are output to a device 19 which first calculates the Nusselt Number. The modified Nusselt Number $Nu_m$ is then calculated from the equation:

$$Nu_m = Nu/pr^p$$

where p depends on the value of the Nuselt Number Nu as explained above. The calculated modified Nusselt Number is then supplied to a device 20 which calculates the Reynolds Number from the modified Nusselt Number and the stored relationship between the modified Nusselt Number and the Reynolds Number (FIG. 7). The Reynolds Number is output to a device 21 which calculates the mass flow from the Reynolds Number and the viscosity derived by the device 18.

An example of the calculation process performed by the system illustrated in FIG. 8 will now be described:

INPUT PARAMETERS
Measured Transducer Data

| Transducer Temperature | $T_s$ °C. |
|---|---|
| Gas Temperature | $T_g$ °C. |
| Transducer Power | Q Watts |

Stored Constants
Gas Property polynominal constants, A, B, C and D for:

| Prandtl Number: | Pr |
|---|---|
| Absolute Viscosity: | μ kg/m · s |
| Thermal Conductivity: | k W/m · K |

Transducer Geometry

| Diameter: | d meters |
|---|---|
| Surface Area: | S sq meters |
| Pipe Diameter: | D meters |

CALCULATION SEQUENCE

The apparatus will carry out the following calculation sequence for every scan of input data.

From the transducer measured parameters:

i) Transducer Differential Temperature dT:

$$dT = (T_s - T_g)$$

and ii) Film Temperature $T_{film}$:

$$(T_s + T_g)/2$$

iii) Using the film temperature and pre-stored gas data, the gas property values can be calculated:

$$Pr = (A_{pr}) + (B_{pr} \cdot T_{film}) + (C_{pr} \cdot T^2_{film}) + (D_{pr} \cdot T_3 Film)$$

$$\mu = (A_\mu) + (B_\mu \cdot T_{film}) + (C_\mu \cdot T^2_{film}) + (D_\mu \cdot T^3_{film})$$

$$k = (A_k) + (B_k \cdot T_{film}) + (C_k \cdot T^2_{film}) + (D_k \cdot T^3_{film})$$

iv) From the measured transducer heater power and calculated differential temperature, the heat transfer function is calculated:

$$H = Q/S \cdot dT$$

v) The heat transfer function is then used to calculate the Nusselt Number:

$$Nu = H \cdot d/k$$

vi) Dependent on the value of the Nusselt Number, one of the following Reynolds Number calculations will be performed For 2<Nu<3.25

$$Re = 27.565 \cdot (Nu \cdot Pr^{2.55})^{3.876}$$

For 3.26<Nu<3.8

$$Re = 28.661 \cdot (Nu \cdot Pr^{2.458})^{3.922}$$

For 3.81<Nu<4.45

$$Re = 28.927 \cdot (Nu \cdot Pr2.458)^{3.922}$$

For 4.46<Nu<6.67

$$Re = 29.403 \cdot (Nu \cdot Pr^{1.93})^{2.967}$$

x) The Unit Mass Flow for the transducer surface is derived
from the calculated Reynolds Number:

$$\text{Unit Mass flow} = Re \cdot \mu/d \ kg/s \cdot m^2$$

xi) The final Mass Flow for the pipe is finally derived thus $$\text{Pipe Mass flow} = \text{Unit Mass Flow } \Pi \cdot D^2/4 \ kg/S$$

Tests have proved that the methodology described above produces acceptable accuracy in flowmeters calibrated using readily available gases such as air, argon and helium even when the flowmeter is used to monitor the flow of different gases. Thus the problem acceptable accuracy in flowmeters intended for use with gases which are either not readily available or cannot be easily used in test rigs has been overcome. A flowmeter intended for use with a specific target gas can be supplied to the end user with appropriate target gas coefficients stored in software. It will of course also be possible to supply a flowmeter which the end user can "recalibrate" to suit different target gases providing the Prandtl Number, viscosity and thermal conductivity coefficients of those target gases are incorporated in the software. The user can the then simply select the appropriate target gas and use the flowmeter without any need to return the flowmeter to the manufacturer for recalibration.

I claim:

1. A fluid mass flowmeter for measuring the mass flow rate of a non-calibrated target fluid travelling through a conduit, the flowmeter comprising a transducer located in the conduit, means for supplying heating power to the transducer, means for measuring the rate that heating power is supplied to the transducer, means for measuring the temperature of said non-calibrated target fluid, means for measuring the temperature of the transducer, means for calculating a temperature of said non-calibrated target fluid adjacent to the transducer from the measured temperature of the transducer and the measured temperature of said non-calibrated target fluid, means for calculating a viscosity of said non-calibrated target fluid and a thermal conductivity of said non-calibrated target fluid from the calculated temperature of the target fluid adjacent to the transducer, means for calibrating the flowmeter based upon a known fluid, the calibrating means including means for storing a relationship between Reynolds number and Nusselt number for the known fluid passing through the flowmeter at a plurality of flow velocities and at a plurality of heating power levels supplied to the transducer, means for calculating a Nusselt number for said non-calibrated target fluid from the measured rate of heating power supplied to the transducer, the difference between the measured temperature of the transducer and measured temperature of said non-calibrated target fluid, and the thermal conductivity of said non-calibrated target fluid, means for determining a Reynolds number for said non-calibrated target fluid based upon the Nusselt number and the relationship between Reynolds number and Nusselt number, and means for calculating the mass flow rate of said non-calibrated target fluid passing through the conduit from the Reynolds number and the calculated viscosity.

2. A flowmeter according to claim 1, wherein the relationship between Reynolds number and Nusselt number is derived by generating test data as the result of passing a plurality of known fluids through the flowmeter at a plurality of heating power levels and at a plurality of flow velocities, and selecting constants A, n and m to fit the equation $Nu = A \cdot Re^n \cdot Pr^m$ to the test data, where Nu=Nusselt Number Re=Reynolds Number Pr=Prandtl Number and wherein means are provided for storing polynomial constants of said non-calibrated target fluid representative of the variation with temperature of the Prandtl Number of said non-calibrated target fluid, and the Reynolds Number determining means determines the Reynolds number from the calculated Nusselt and Prandtl numbers and the relationship between Reynolds number and Nusselt number.

3. A flowmeter according to claim 1, wherein the relationship between Reynolds number and Nusselt number is stored in the form of constants relating the Nusselt Number to the Reynolds number for each of a plurality of ranges of values for the Nusselt Number.

4. A flowmeter according to claim 1, wherein the relationship between Reynolds number and Nusselt number is stored in the form of constants relating the Nusselt Number, the Prandtl Number and the Reynolds Number for each of a plurality of ranges of values for the Nusselt Number.

5. A flowmeter according to claim 1, wherein the means for calculating the temperature of said non-calibrated target fluid adjacent to the transducer calculates half the sum of the measured temperature of the transducer and the measured temperature of said non-calibrated target fluid.

6. A flowmeter according to claim 1, further comprising means for maintaining the rate of heating power supply above a minimum threshold power level.

7. A flowmeter according to claim 6, wherein the minimum threshold power level is 50 mWatts.

8. A flowmeter according to claim 1, wherein the transducer comprises a cylindrical body extending perpendicular to an internal wall of the conduit, the conduit having a circular cross-section.

9. A flowmeter according to claim 1, wherein the transducer comprises a heating element supported within a ceramic former located within a metallic sheath, the means for measuring the temperature of the transducer comprising a resistive temperature sensor embedded within the ceramic former.

10. A flowmeter according to claim 1, wherein the means for measuring the temperature of said non-calibrated target fluid within the conduit comprises a resistive temperature sensor spaced from the transducer.

11. A flowmeter according to claim 10 wherein the temperature sensor and the transducer are spaced apart both axially along the conduit and transversely to the pipe.

12. A flowmeter for measuring a mass flow rate of a non-calibrate target fluid passing through a conduit utilizing a calibration obtained from a calibrated known fluid, the flowmeter comprising means for calibrating the flowmeter based upon said calibrated known fluid, the calibrating means including means for storing a relationship between Reynolds number and Nusselt number for said calibrated known fluid passing through the flowmeter, and means for calculating the mass flow rate of said non-calibrated target fluid from the relationship between Reynolds number and Nusselt number for said calibrated known fluid.

13. The flowmeter of claim 12, wherein the relationship between Reynolds number and Nusselt number is based upon a correlation between Reynolds number, Nusselt number, and Prandtl number.

14. The flowmeter of claim 12, wherein the relationship between Reynolds number and Nusselt number is based upon the following equation:

$$Nu = A \times Re^n \times Pr^m$$

where

A, n, and m are constants

Nu=Nusselt Number

Re=Reynolds Number

Pr=Prandtl Number.

15. The flowmeter of claim 12, wherein the relationship between Reynolds number and Nusselt number is a curve that can be plotted based on the following:

$$Nu/Pr \text{ vs. } Re$$

where

Nu=Nusselt Number

Re=Reynolds Number

Pr=Prandtl Number.

* * * * *